Nov. 28, 1939.  H. F. WATKINS  2,181,442
FRUIT HANDLING MACHINE
Filed Jan. 11, 1937    9 Sheets-Sheet 1
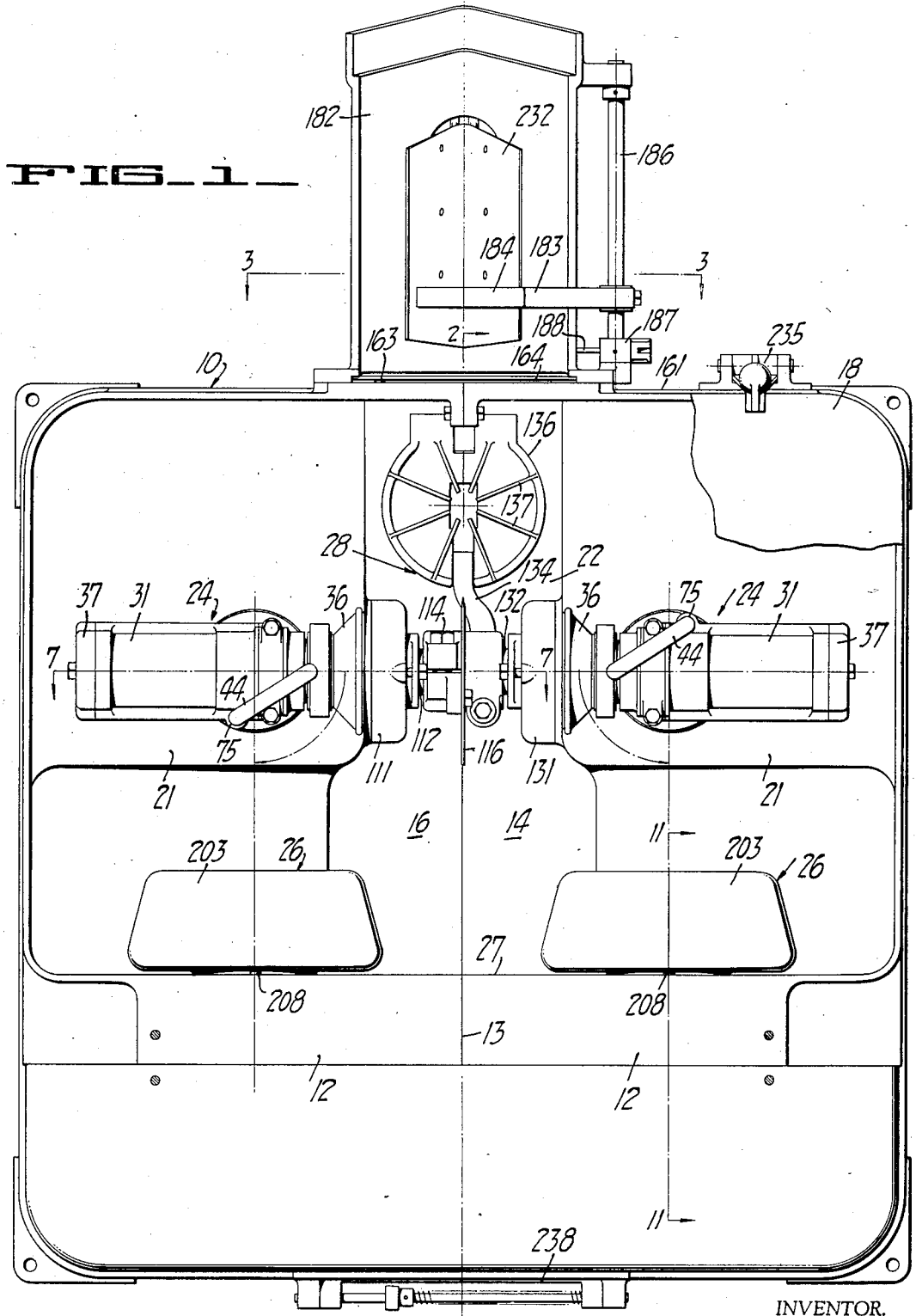
INVENTOR.
Harold F. Watkins
BY
ATTORNEY.

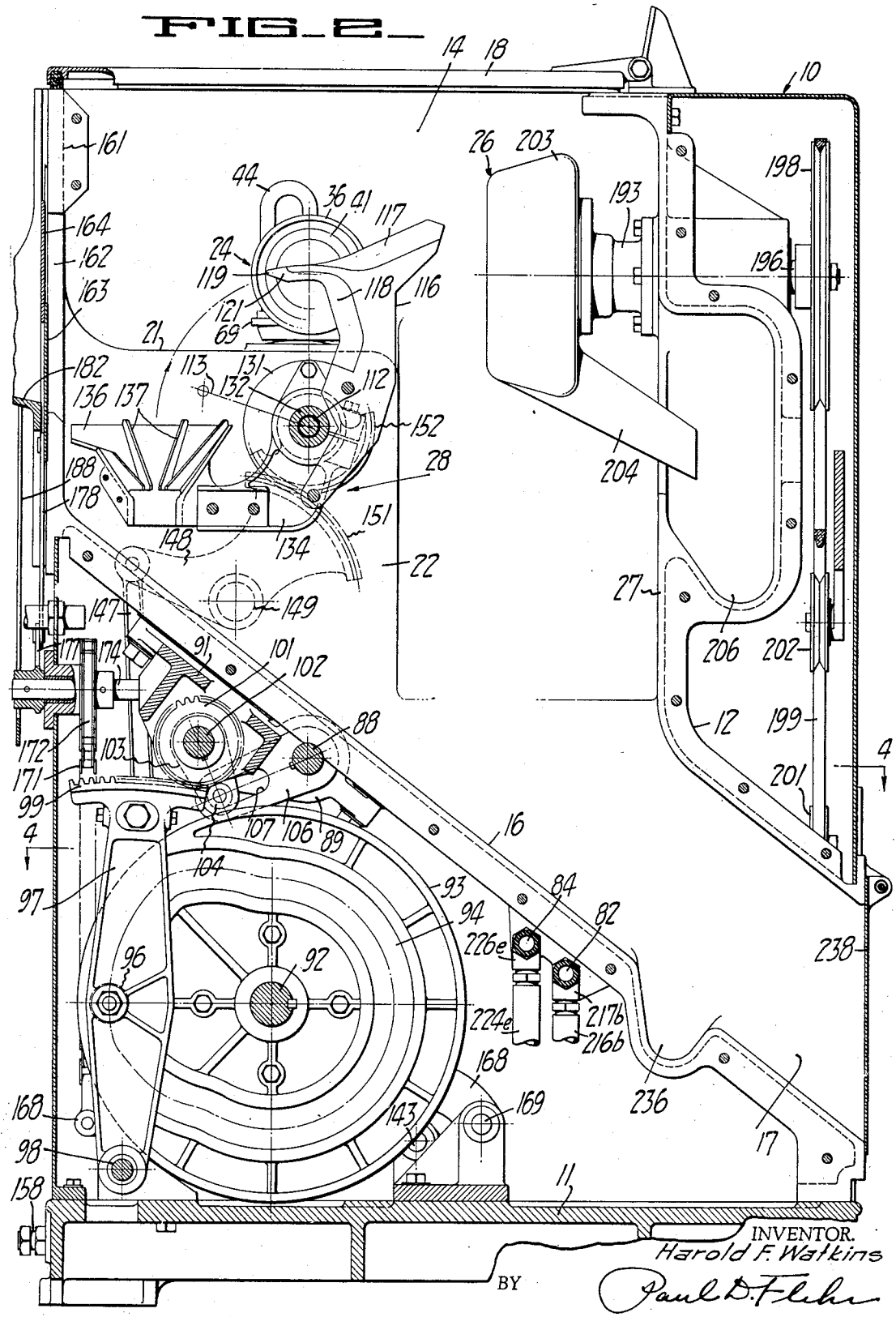

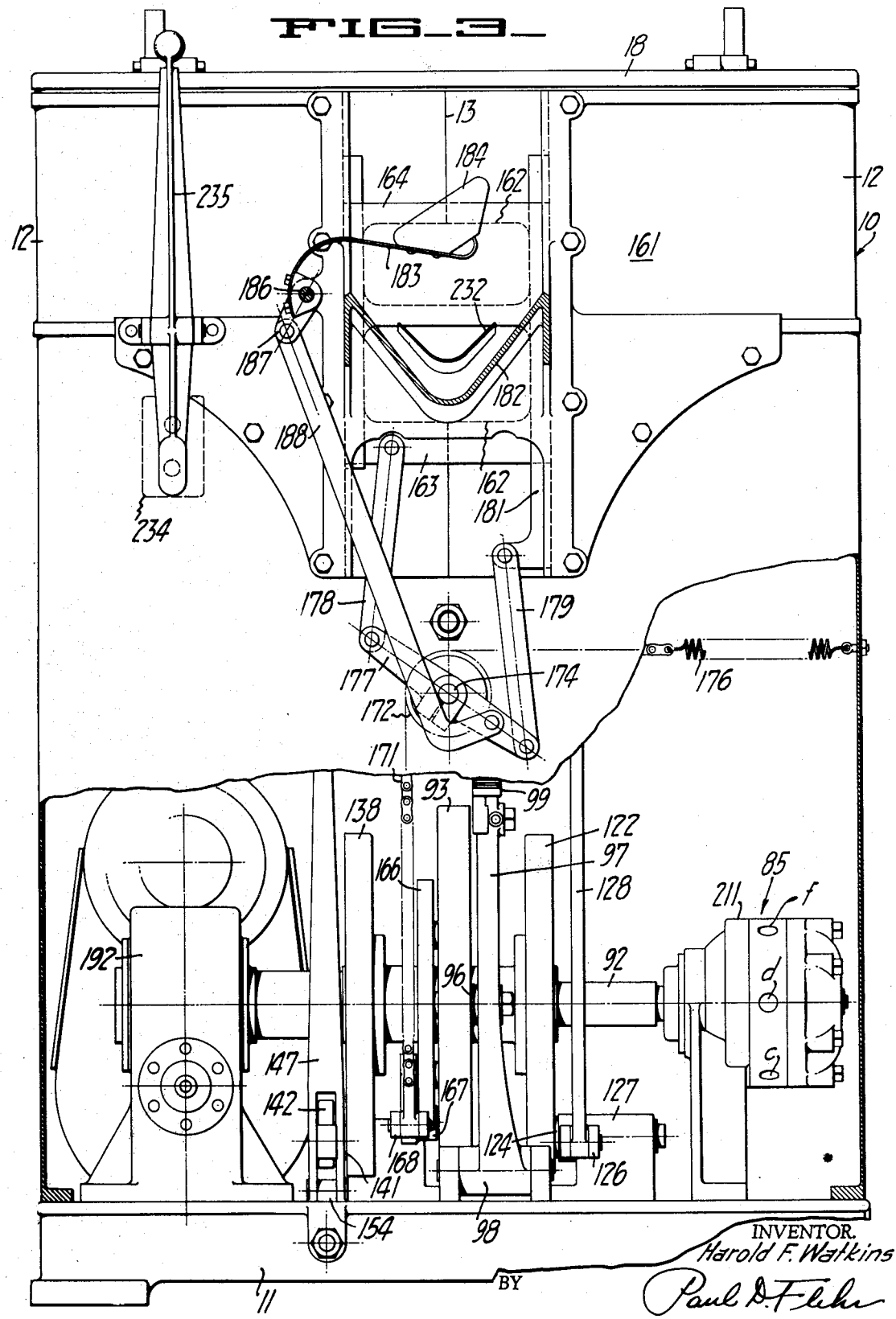

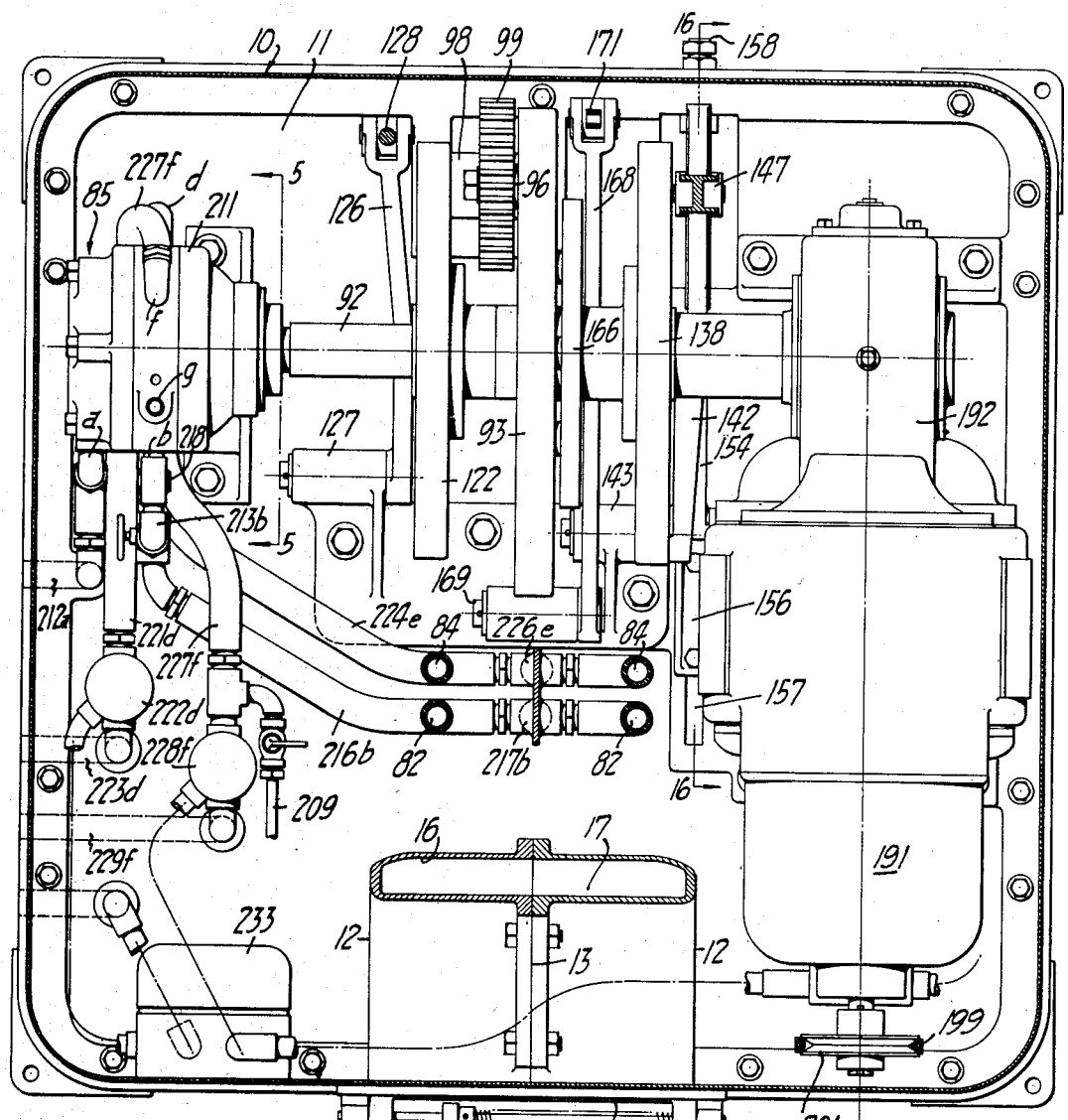
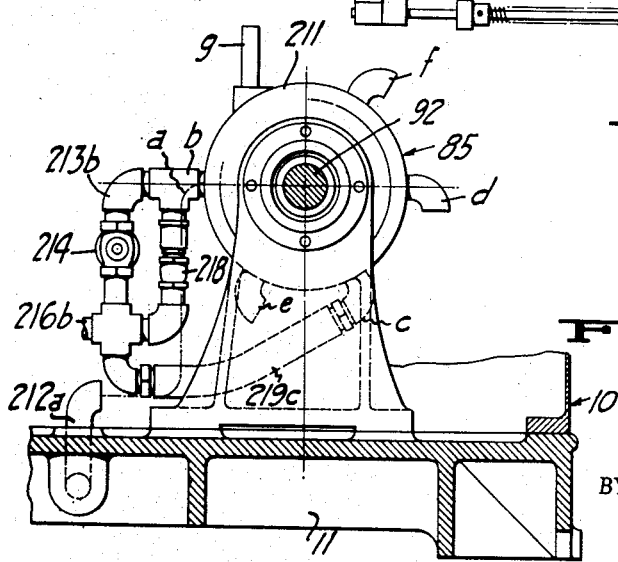
FIG_4_
FIG_5_

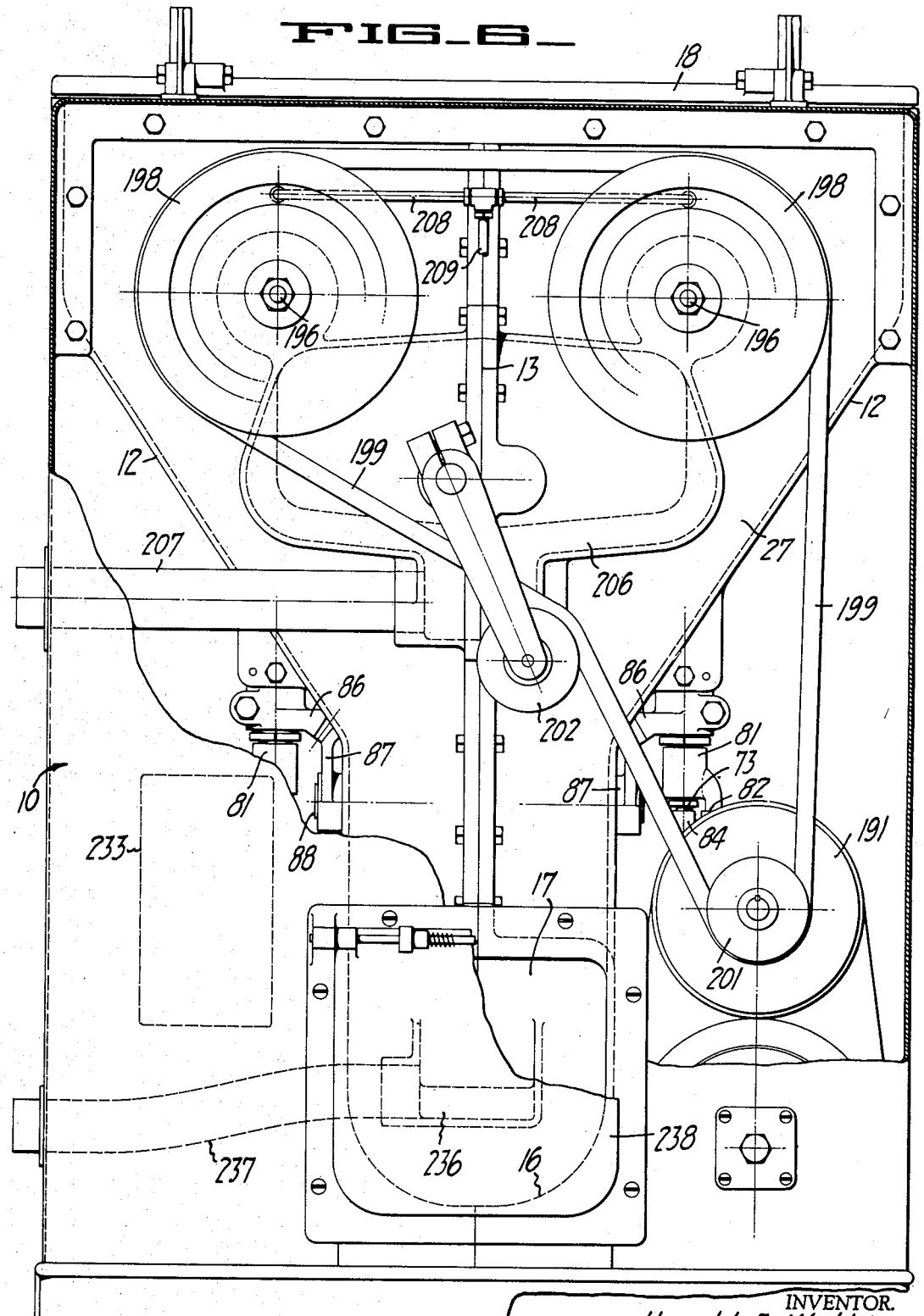

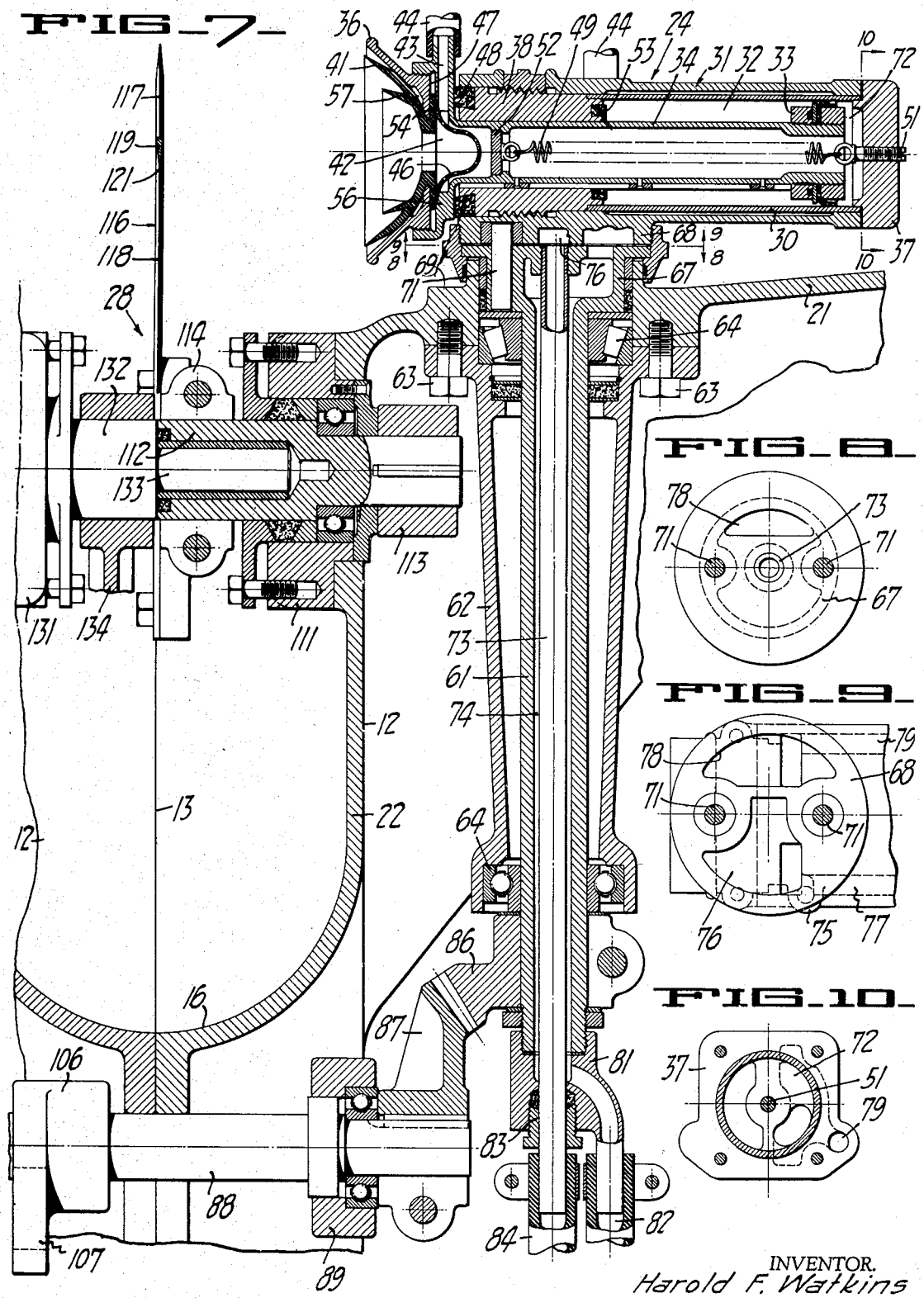

Nov. 28, 1939.　　　H. F. WATKINS　　　2,181,442
FRUIT HANDLING MACHINE
Filed Jan. 11, 1937　　　9 Sheets-Sheet 7
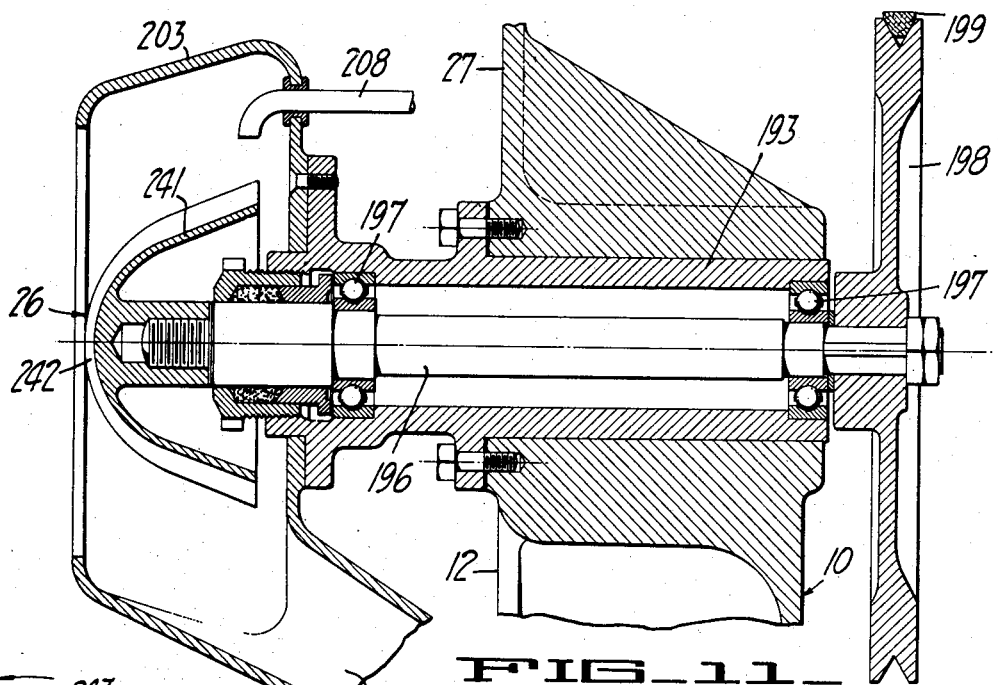
FIG_11_
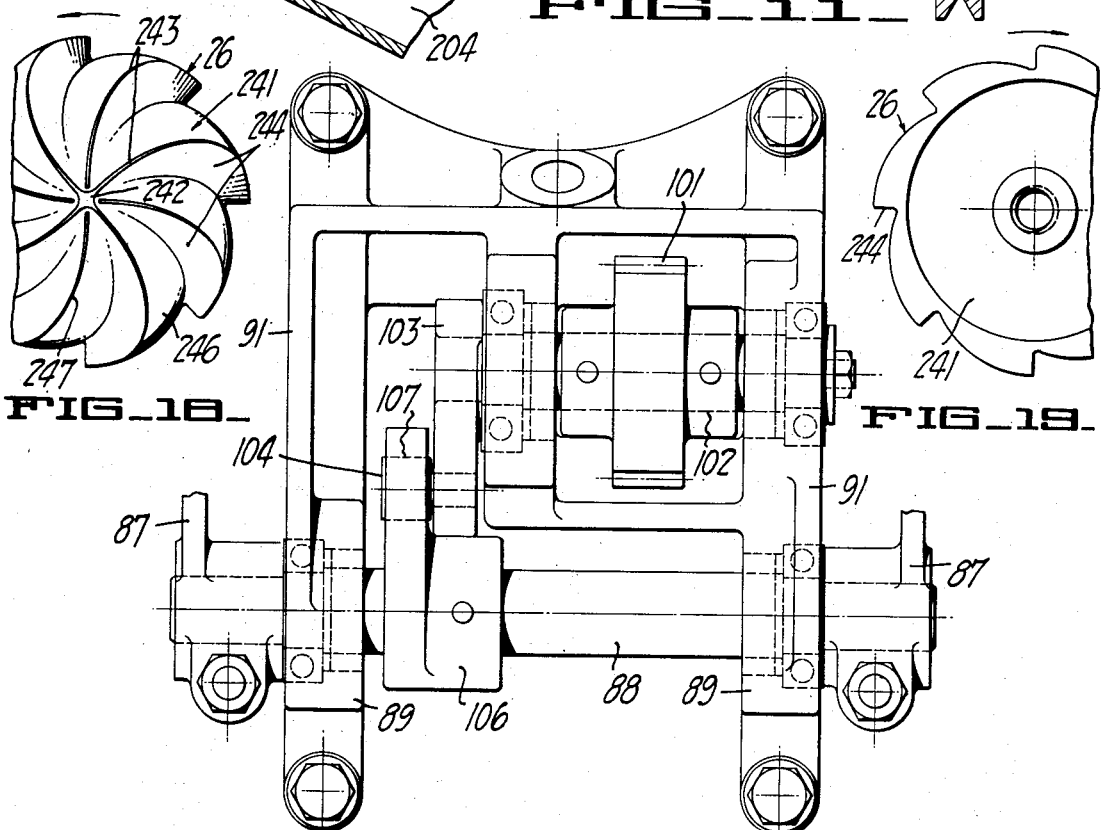
FIG_18_　　　FIG_12_　　　FIG_19_
INVENTOR.
Harold F. Watkins
BY Paul D. Flehr
ATTORNEY.

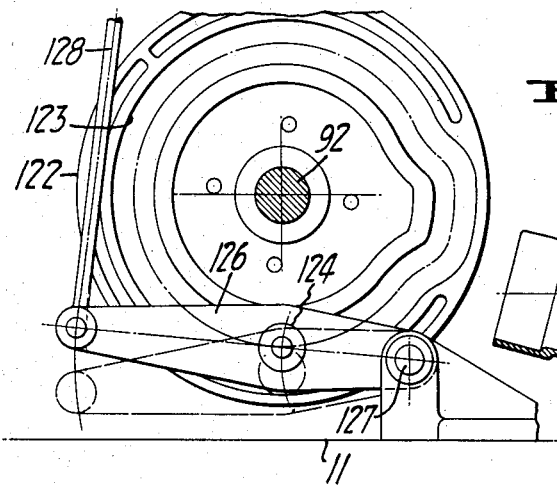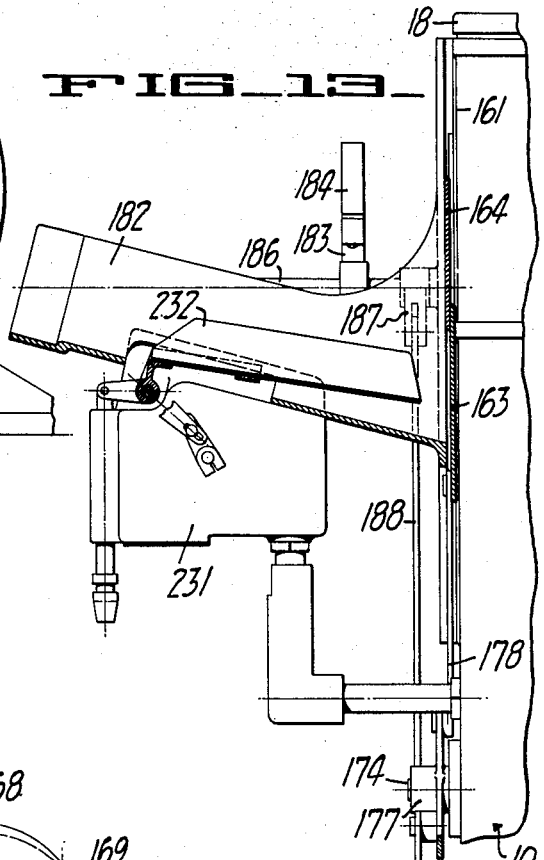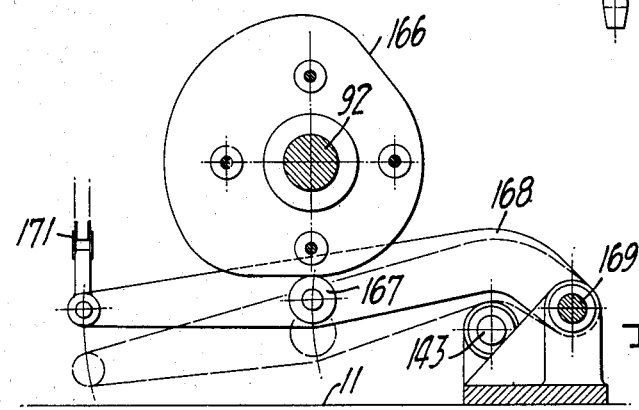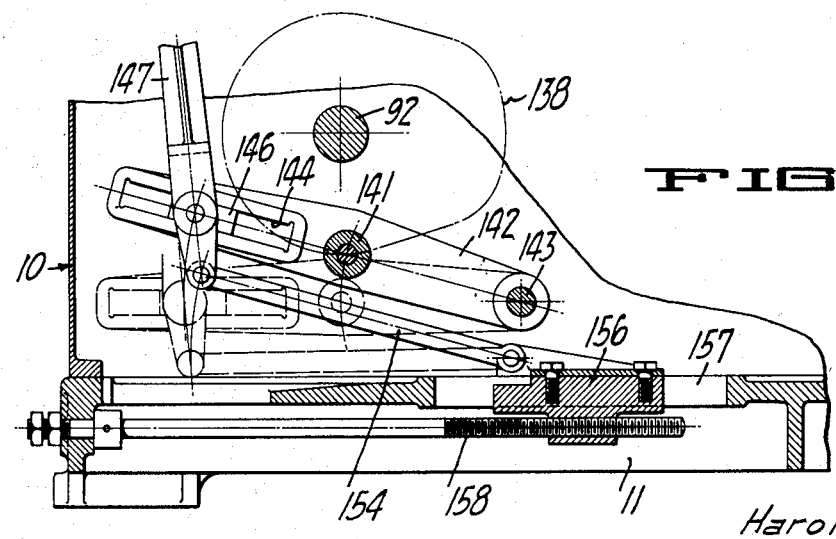

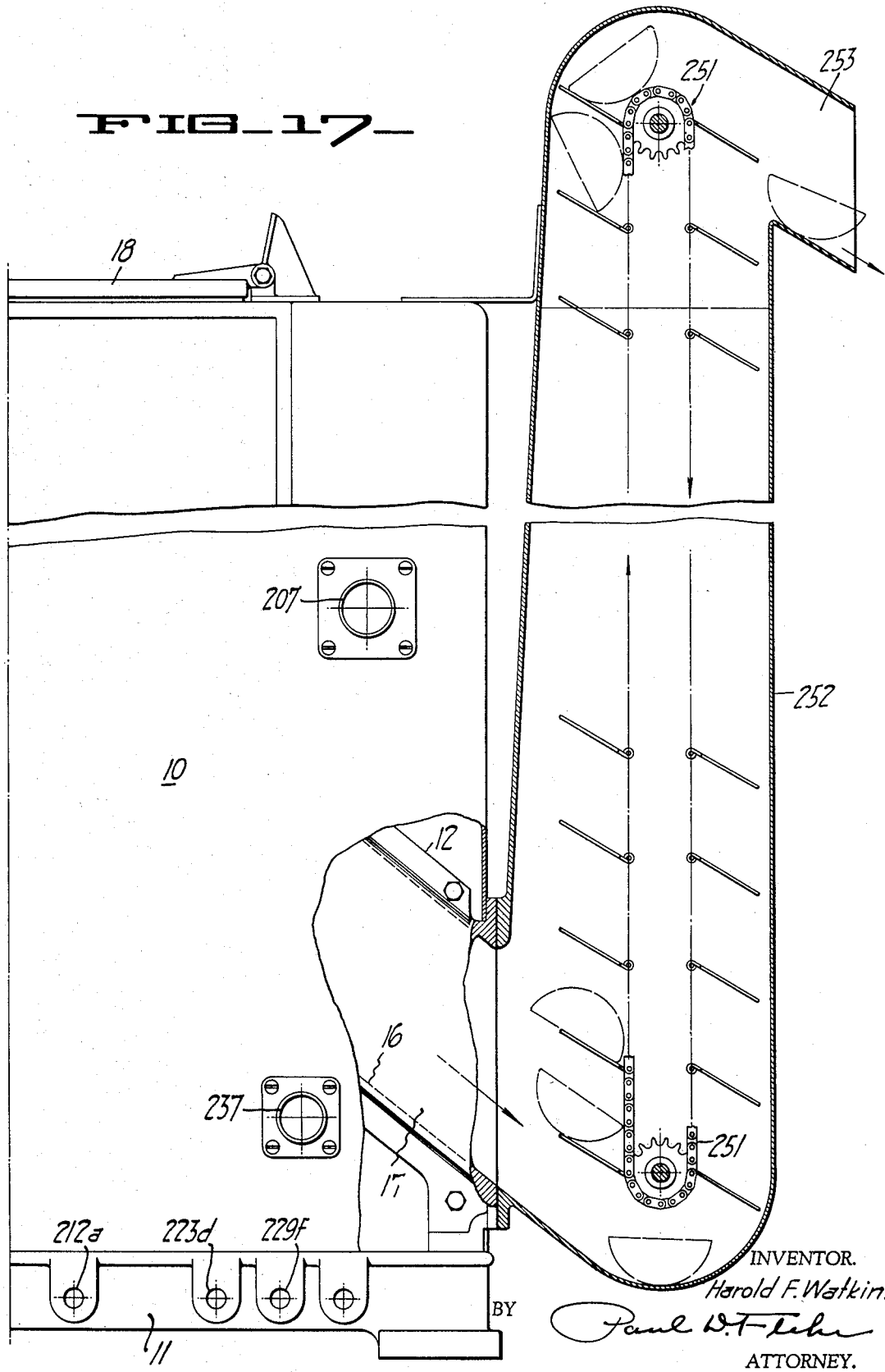

Patented Nov. 28, 1939

2,181,442

UNITED STATES PATENT OFFICE 2,181,442

FRUIT HANDLING MACHINE

Harold F. Watkins, Oakland, Calif., assignor to Watkins Fruit Machinery Company, San Francisco, Calif., a corporation of California Application January 11, 1937, Serial No. 119,971

9 Claims. (Cl. 146—3)

This invention relates generally to machines for the handling of fruit, and is particularly adapted for the extraction of juices from citrus fruit, such as oranges, lemons and grapefruit.

It is an object of the invention to generally improve upon fruit juice extracting machines of the type disclosed and claimed in my Patent No. 2,040,114, and my co-pending application Serial No. 43,852, filed October 7, 1935.

The improvement features disclosed herein can be outlined as follows: The general mechanical design and mechanical movements utilized have been further simplified, to provide a rugged construction which will withstand the severe usage of commercial operation. The means for providing for presenting halved articles of fruit to the fruit handling devices, has been further improved, whereby the fruit is better centered for engagement by the fruit handling devices, and whereby the machine can be more readily adjusted to take different sized fruit. Whereas, in my co-pending application Serial No. 43,852, pneumatic means is disclosed for the purpose of both retracting and projecting the fruit handling cups, in the present machine the fruit handling cups are projected pneumatically, but retracted by means of a spring or like simple mechanical element. This enables simplification of the so-called current assemblies, and also simplifies construction of the valve mechanism for applying varying pneumatic pressures. Application of an inert atmosphere, like carbon dioxide, is made more effective by applying a stream of such gas directly to the rotating burrs, to which the halves of fruit are applied. Also novel arrangement is made for admitting inert gas to the operating chamber of the machine, from the fruit engaging cups. The various cam elements, and the mechanism for connecting the cam elements to the various cyclically operating parts has been greatly simplified and strengthened, to enable faster operation with a minimum amount of noise and vibration. In addition to providing means for draining away juice extracted by the rotatable burrs, auxiliary drainage means is provided for recovering juice expelled when the articles of fruit are severed. Various other features of the machine have been improved, as will appear from the subsequent detailed description.

Referring to the drawings:

Fig. 1 is a plan view of the preferred embodiment of my machine, with the cover removed to expose certain working parts.

Fig. 2 is a cross-sectional view taken along the line 2—2 of Fig. 1.

Fig. 3 is a front view of the machine, taken along the line 3—3 of Fig. 1, and with certain parts broken away to disclose the cam mechanism, and parts associated with the same.

Fig. 4 is a cross-sectional view taken along the line 4—4 of Fig. 2.

Fig. 5 is a cross-sectional detail taken along the line 5—5 of Fig. 4.

Fig. 6 is a side elevational detail, looking towards the rear side of the machine, and with a portion of the housing broken away to expose working parts.

Fig. 7 is a cross-sectional detail, on an enlarged scale, taken along the line 7—7 of Fig. 1.

Fig. 8 is a cross-sectional detail taken along the line 8—8 of Fig. 7.

Fig. 9 is a cross-sectional detail taken along the line 9—9 of Fig. 7.

Fig. 10 is a cross-sectional detail taken along the line 10—10 of Fig. 7.

Fig. 11 is a cross-sectional detail taken along the line 11—11 of Fig. 1.

Fig. 12 is a detail, in plan, showing motion applying mechanism interconnecting the turret assemblies with the cam operator for the same.

Fig. 13 is a cross-sectional detail, showing automatic switch controlling mechanism, to discontinue operation of the machine, in the event the supply of fruit is interrupted.

Fig. 14 is a cross-sectional detail, illustrating the knife operating cam and its associated mechanism.

Fig. 15 is a cross-sectional detail, showing the door operating cam, and its associated parts.

Fig. 16 is a cross-sectional detail showing the centering cup operating cam, and its associated parts, the section being taken along the line 16—16 of Fig. 4.

Fig. 17 is a modified form of discharge means for the peel.

Fig. 18 is a view from the forward end of the burr.

Fig. 19 is a rear end view of the burr.

The present invention, in common with the disclosure of my aforesaid Patent No. 2,040,114 and application Serial No. 43,852, makes use of turret-like fruit handling devices, which grip the halves of a severed article of fruit, and present the two halves upon rotating burrs for a juicing operation. Following this juicing operation the peels are expelled from the fruit handling devices, and these devices then engage the halves of a successive article of fruit, which in the meantime has been halved and properly positioned for engagement.

Referring now to the machine illustrated in the drawings, it consists of a housing 10 which is provided with a supporting base 11. The main part of the housing is formed of a casing 12, preferably in two parts which are joined together along the central vertical junction plane 13, and which are made of suitable material, such as an aluminum alloy. The upper part of the casting 12 affords a chamber 14, in which the principal operating parts are disposed. The lower wall 16 of the casting 12 is sloped downwardly (Fig. 2), and a discharge chute 17 is provided for the purpose of conveying away peels. Chamber 14 is provided with a suitable hinged cover 18. The housing includes suitable additional wall sections, which are attached to the casing 12 and to the base 11, in order to enclose additional working parts, and to afford a cabinet-shaped contour. Within the chamber 14 are the two inclined shelves 21 (Figs. 1 and 7) which have their inner opposed edges joined by the trough 22 (Fig. 7). Passage 17 is in effect an extension of trough 22, as is shown in Fig. 2.

The turret-like fruit handling devices are designated generally at 24 (Figs. 1, 2, and 7), and are disposed above the shelves 21. Spaced rotatable burrs 26 are carried by the rear casing wall 27, and are arranged to operate upon fruit presented by the fruit handling devices 24. Mechanism for halving articles of fruit and for presenting such halved articles to the turret-like fruit handling devices 24, is indicated generally at 28. It is the fruit handling devices 24 which serve to successively apply halved articles of fruit upon the rotating burrs 26, whereby juice is extracted by well-known principles.

The two fruit handling devices 24 are identical in construction, and can best be explained by reference to Fig. 7. Each device consists of a hollow shell 31, the interior of which can be provided with a liner 30 to form a cylinder 32. Slidably fitted in cylinder 32 there is a piston 33, which in turn is secured to the inner end of a hollow tubular member 34. The outer end of tubular member 34 is attached to the fruit engaging cup 36. The rear end of each member 31 is provided with a closure block 37, while the forward end of member 31 is provided with an annular sleeve or bushing 38, which serves as a guide for tube 34.

Cup 36 is formed of suitable material, such as aluminum or aluminum alloy, and is provided with an inner liner 41 of resilient material, such as soft vulcanized rubber. The base of cup 36 is provided with an opening 42, which communicates with a laterally extending duct 43, and which is shown attached to a flexible tube or hose 44. A screen 46 is shown positioned in opening 42, to prevent entrance of seeds, peels or like foreign material, into duct 43. The rear face 47 of cup 36, is arranged to engage a buffer ring 48, which is mounted upon the adjacent end of the shell 31. This ring 48 can be made of suitable resilient material, such as leather or resilient vulcanized rubber.

In order to normally urge the piston 33 towards retracted position, a tension spring 49 is shown mounted within the tubular member 34, with one end of this spring secured to the anchoring screw 51, and the other end attached to the plug 52. In order to limit movement of the piston 33 towards projected position, an annular ring 53, of suitable material such as resilient vulcanized rubber, is mounted upon the inner face of the guide sleeve 38.

For retaining the liner 41 within the cup 36, the liner is shown having an outwardly turned annular edge 54, which extends between the opposed faces of the cup 36, and the end portion 56 of tubular member 34. In order to facilitate sealing engagement with the surface of the fruit, the liner 41 has its forward edge portion tapered or feathered to form a gripping edge 57 of great flexibility. Also an integral annular portion 58 is provided, which is likewise tapered or feathered to provide a supplemental gripping edge, which can readily conform to the surface of the fruit, and form a seal thereon.

In order to pivotally mount the fruit handling devices, journalling means are provided as follows: A pair of spaced vertical shafts 61 are provided, which are enclosed within tubular casings 62. The upper ends of casing 62 are secured to the shelves 21, by suitable means such as bolts 63. Near the upper and lower ends of each casing 62, bearing assemblies 64 are provided to insure smooth operation of shaft 61, with a minimum amount of friction. Secured to or formed on the upper end of each shaft 61, there is an enlarged head 67, which directly underlies an annular pad 68, formed on the lower side of the shell 31. A ferrule 69 engages an annular shoulder on head 67, and has a screw threaded engagement with the pad 68. By means of this ferrule the top face of the head 67, and the lower face of pad 68, are tightly clamped together. In order to afford a positive driving engagement, dowels or pins 71 are shown fitted within concentric holes provided in the head 67, and pad 68.

Two separate air passages extend upwardly through each shaft 61, and are in communication respectively with the duct 42 of each fruit handling cup 36, and with the space 72 behind each piston 33. Thus each shaft 61 is made hollow, to accommodate a concentric pipe 73. The interior of each pipe 73 forms one passage, while the other passage is formed by the space 74 about this pipe. The upper end of each pipe 73 has a pneumatic connection with the corresponding hose 44. This communication is established through a recess 76, formed in the pad 68, which in turn communicates with a side duct 77, formed in the shell 31, and from thence to a fitting 75 connected to hose 44. Space 74 connects with the space 72 behind the piston 33, through the recess 78, and the communicating duct 79.

At the lower end of each tubular shaft 61, a fitting 81 is provided, which connects to the pneumatic hose 82, and which has a packing gland 83 to seal about the pipe 73. The outer or lower end of pipe 73, is connected to the pneumatic hose 84. The pneumatic hoses 82 and 84 lead to a pneumatic valve mechanism 85 (Figs. 4 and 5) which will be subsequently referred to in greater detail, but which serves to control application of pneumatic pressure or vacuum to the fruit handling devices.

The actuating means for turning the shafts 61, to oscillate the turret-like fruit handling devices 24, can be constructed as follows: A bevelled gear segment 86 is secured to the lower end of each shaft 61, and is engaged by a bevelled gear segment 87, mounted upon the laterally extending shaft 88. Shaft 88 is mounted within suitable journals 89, the journals 89 being carried by a sub-frame 91, which in turn is mounted upon the lower side of the casing 12.

Mounted horizontally above the base 11 of the machine, there is a driven cam shaft 92, the axis of which extends parallel to the axis of shaft 88. Mounted upon this shaft are several cams including particularly a cam 93 for applying motion to the shaft 88 and the turret-like fruit handling devices. One face of the cam 93 is provided with a cam groove 94 (Fig. 2) which is engaged by a cam roller 96. This roller is carried by a lever 97, the lower end of which has a fixed pivotal mounting 98 to the base 11. The upper end of lever 97 carries a spur gear segment 99, which engages a cooperating spur gear 101. Gear 101 is mounted upon a shaft 102 which is disposed parallel and adjacent to the shaft 88 (Figs. 2 and 12). Secured to shaft 102 there is also an arm 103, the free end of which carries a roller 104. Fixed to shaft 88 there is a lever 106, provided with a slot 107, in which the roller 104 engages. It will be evident that when lever 97 is oscillated, by rotation of cam 93, shaft 102 and arm 103 are also oscillated, to cause corresponding oscillating movement of shaft 88, shafts 61, and the turret-like fruit handling devices 24.

The mechanism 28 for presenting halved articles of fruit to the fruit handling devices 24, is preferably constructed as follows: A journal 111 serves as a mounting for a shaft 112, and the outer end of this shaft is keyed to an arm 113. Adjustably clamped to this shaft there is a mounting 114, for the blade or knife 116. The blade is provided with sharpened edges 117 and 118, and with an impaling point 119. The impaling point also has a lower sharpened edge 121, merging with the sharpened edge 118. The main body of this blade is connected by an extension arm to the mounting 114.

Arm 113, which as previously mentioned is keyed to the blade shaft 112, is operated by the cam 122 of the cam shaft 92 (Fig. 3). Thus the cam groove 123 of this cam is engaged by roller 124, which is carried by the lever 126. One end of this lever has a fixed pivotal mounting 127 to the machine base 11, while the other end is connected to a link 128, the upper end of which is connected to the free end arm 113. Thus rotation of cam 122 causes cyclic oscillation of the blade 116. Aligned with shaft 112 and carried by a similar journal 131, there is a shaft 132. Shaft 132 is shown provided with an extension 133, which fits within and forms a journal within shaft 112. An arm 134 is mounted upon shaft 132, and the free end of this arm carried a centering cup 136 (Fig. 2). The centering cup 136 is generally conical in shape, and its face is shown provided with raised ribs 137, to engage the surfaces of fruit.

The centering cup 136 is raised and lowered by mechanism making use of another cam 138, which is also mounted upon the cam shaft 92 (Figs. 3 and 16). The cam groove afforded by this cam element, is engaged by a roller 141 (Fig. 16) which is mounted upon a lever 142. One end of lever 142 has a fixed pivotal mounting 143 to the base of the machine, while the other end is provided with a slot 144, engaged by a slidable block 146. Block 146 has a pivotal connection to the lower end portion of a link 147, the upper end of which is pivotally connected to an arm 148 (Fig. 2) carried by stub shaft 149. Arm 148 also carries a spur gear segment 151 which engages a spur gear segment 152, keyed to the outer end of shaft 132.

The lower extremity of link 147 below block 146, is pivotally connected to a link 154, which in turn has pivotal connection to adjustable block 156. This block is slidably carried within a slot 157, formed in the machine base, and has a threaded connection with an adjustable rod 158. Thus by turning rod 158 the position of block 156 can be adjusted, and thus the position of block 146 with respect to lever 142 adjusted in order to vary the amplitude of movement imparted to the centering cone. It will be noted that when lever 142 is in its lowermost position slot 144 is substantially horizontal. Therefore adjustment of the setting of block 156 will not vary the lowest position of the centering cup 136, but will vary its other limiting position.

To facilitate an understanding of mechanism 28, it can be pointed out at this time that the cycle of operation of the centering cup 136, and the blade 116, is somewhat as follows: After an article of fruit has been placed within the centering cup 136, this cup swings upwardly and impales the article of fruit upon the blade point 119. Thereafter the centering cup moves back to its initial position to receive a successive article of fruit. The two halves of the article of fruit are engaged by the turret-like fruit handling devices 24, and during such engagement the blade is oscillated to completely sever the two halves.

As a means for feeding successive articles of fruit to the centering cup 136, means are provided as follows: The front wall 161 of the casing 12 is provided with an opening 162, which is adjacent to the centering cup 136. This opening is adapted to be opened and closed by a pair of gates 163 and 164. The gate 163 is mounted for sliding movement in a vertical direction, and is connected to operating mechanism as follows: Mounted upon the cam shaft 92 (Figs. 3 and 15) there is another cam 166, the peripheral cam surface of which is engaged by a roller 167. Roller 167 is carried by lever 168, one end of which has a pivotal mounting 169 to the base of the machine, and the end of which is connected to the lower end of a chain 171. This chain passes over a sprocket 172 (Figs. 2 and 3) which is mounted upon the shaft 174, and connects to one end of a tension spring 176. Fixed to the shaft 174 there is a rocker arm 177, one end of which is connected to the door 163 by link 178, and the other end of which is connected to the door 164, by link 179 and the extension 181. Thus as cam 166 rotates, lever 168 is oscillated to reciprocate the chain 171, and to oscillate sprocket 172 and the rocker arm 177. Such motion, transmitted through links 178 and 179, causes the doors 163 and 164 to move towards each other to closed position, and to move apart to open position to permit articles of fruit to pass through the opening 162.

A substantially V-shaped trough 182 serves to convey articles of fruit in single file, through the opening 162 (Figs. 1 and 13). In conjunction with this trough it is desirable to provide means which will insure passage of fruit one by one through the opening 162, without crowding. This function is carried out by a spring finger 183 which has a paddle-shaped member 184 on its free end. The other end of this finger is adjustably mounted upon a shaft 186, to which an arm 187 is also secured (Fig. 3). A link 188 serves to connect arm 187 with the rocker arm 177. Thus as rocker arm 177 is moved cyclically, resilient finger 183 is swung upwardly and downwardly, and in its downward position is pressed between the article of fruit which is next to pass through the opening 102, and the next succeeding article of fruit. It is desirable that the mounting of spring finger 183 to shaft 186 be adjustable, so that the finger can be adjusted to different positions for fruit of different sizes.

A suitable electrical motor 191 (Fig. 4) is shown for driving the operating parts of the machine. This motor is equipped with a suitable reduction gearing 192, which is preferably of the variable ratio type, and which is connected to drive the cam shaft 82.

The mounting for the burrs 26, and the driving mechanism for the same, is preferably as follows: A pair of sleeves 193 extend through and are mounted upon the rear wall 27 of the casing 12, and extending through these sleeves are the spaced parallel shafts 196. Suitable ball bearing asemblies 197 serve to journal the shafts 196 upon the ends of the sleeves 193, and the forward end of each shaft has a suitable detachable engagement with its associated burr 26. A pulley 198 is secured to the rear or external end of each shaft 196, and these pulleys are engaged by a common driving belt 199 (Fig. 6). This belt also engages a high-speed drive pulley 201, which extends from the rear end of the electric motor 191, whereby the two pulleys 198, and the two burrs, are driven at a proper speed. An adjustable idler pulley 202 is also provided, to take up slack in the belt. For the purpose of catching juice expelled from an article of fruit operated upon by the rotating burrs, each burr is surrounded by an annular hood 203. The lower portion of each hood 203 communicates with a drainage conduit 204, which in turn leads to a receptacle 206 (Figs. 2 and 6) formed in the rear of the casing 12. Pipe 207 leads from receptacle 206, to the exterior of the machine.

I have found that it is a distinct advantage to preclude contact of oxygen with the juice, during the time the fruit and the juice is being handled by the machine. The presence of oxygen during the time the juice is being operated upon by a rotating burr, appears to be particularly detrimental, because the oxygen is contacted with atomized particles of the juice. It is a feature of the present machine that an inert gaseous medium is utilized, to contact with the fruit and with the juice, while it is being handled by the machine. In this connection a pair of pipes 208 (Figs. 6 and 11) are shown communicating with each hood 203, and these pipes connect to a common pipe 209, leading to a source of inert gas under pressure, such as carbon dioxide. Pipes 208 during normal operation of the machine direct streams of carbon dioxide into the hoods 203, to insure the presence of an inert gaseous medium.

The valve means 85 and its various pneumatic connections, can be outlined briefly as follows: It is of the rotatable type, with its outer stationary casing 211 mounted upon the base of the machine, and with its operating shaft directly connected to the cam shaft 82. The housing of this valve is provided with a number of ducts which communicate with fittings designated by letters $a$, $b$, $c$, $d$, $e$ and $f$. The fitting $a$ connects with a pipe 212$a$, which in turn leads to a source of air under pressure. Fitting $b$ connects with a pipe 213$b$, which is provided with a throttling valve 214, and which also connects with the pneumatic hose 216$b$. This hose leads to a manifold 217$b$, with which the pressure hoses 82 (leading to the two turret-like handling devices) are connected. Throttling valve 214 is shunted by a check valve 218, which is opened by back fluid pressure to permit unrestricted exhaust of air back through hose 216$b$, to the valve casing 211. Hose 216$b$ also connects with a hose or pipe 219$c$, leading to the fitting $c$. Fitting $d$ connects with a hose 221$d$, which leads to the outlet side of a solenoid valve 222$d$. The inlet side of this valve is connected to the vacuum pipe 223$d$, which leads to suitable external evacuating means.

Fitting $e$ connects with hose 224$e$, which leads to the manifold 226$e$. The hoses 84 for the individual turrets connect to this manifold. Fitting $f$ connects with a hose 227$f$, which in turn connects to the outlet side of a solenoid valve 228$f$, the inlet side of which connects to a pipe 229$f$ for supplying carbon dioxide gas under pressure. Note that the outlet side of solenoid valve 228$f$ is also shown connected with the pipe 209, which leads to the hoods surrounding the burrs. The casing is also shown connected to a vent or exhaust pipe $g$.

The working parts of the valve 85, are ported in order to effect a proper distribution of the gas flow, whereby a cycle of operation is afforded as follows: For one revolution of the cam shaft 82, and assuming that both of the solenoid valves 222$d$ and 228$f$, are opened, communication is initially established between the fittings $a$ and $b$, whereby for a limited period compressed air under pressure is supplied to the hose 216$b$, and the hoses 82, to project the fruit engaging cups upon opposite sides of the fruit. Such projection is timed to occur as the centering cup 36 presents the fruit between the two cups, and as the cups are aligned substantially as shown in Fig. 1. Immediately after such application of air under pressure through hose 216$b$, to project the fruit gripping cups, fittings $d$ and $e$ are placed in communication, whereby vacuum from pipe 223$d$ is impressed upon the hose 224$e$, and thus the interiors of the fruit handling cups 36 are evacuated. This evacuation of the fruit handling cups takes place concomitantly with or immediately prior to contact of these cups with the sides of the fruit, whereby the sides of the fruit are properly gripped. While the fruit is so gripped, blade 116 is oscillated to sever the two halves. Further communication between fittings $a$ and $b$ is interrupted, and during the next period of operation the fruit handling devices are being rotated about their axes, preparatory to applying the halves of the fruit to the rotating burrs. As the fruit handling devices reach positions approximately in alignment with the rotating burrs, fittings $a$ and $c$ are placed in communication, whereby compressed air is again supplied through the hose 216$b$, behind the pistons 33, to project the fruit handling cups, and to force the two halves of the fruit upon the rotating burrs. During this time the fittings $d$ and $e$ have remained in communication, to maintain the fruit gripping cups evacuated.

Communication between fittings $a$ and $c$ is now interrupted, and fitting $b$ is again placed in communication with the exhaust fitting $g$, to permit back surge of exhaust of compressed air from behind the pistons 33, thus permitting the fruit handling cups to move to retracted positions. Immediately after commencement of such retraction, and following discontinuance of communication between fittings $a$ and $c$, valve 85 establishes communication between fittings $e$ and $f$, to permit a surge of carbon dioxide gas under pressure to flow through the hose 224e and through the vacuum connections to the interior of the cups 36. The purpose of this surge of carbon dioxide gas, which is of only momentary duration, is to blow away the peel from the fruit handling cups, thus permitting the peels to drop downwardly for discharge. Carbon dioxide is used for this purpose, as a novel means for maintaining the interior of the chamber 14 filled with carbon dioxide. After a short interval of time further communication between fittings e and f is discontinued, and the turret-like fruit handling devices are now moved back to the position illustrated in Fig. 1, at which time the valve 85 completes its cycle of operation.

Solenoids 222d and 228f, are for the purpose of enabling automatic shut-off of pipes 223d and 229f, in the event the supply of fruit to the machine is discontinued. Electrical control mechanism for this purpose, can be constructed as follows: Mounted below the trough 182 there is an electrical switch 231, as for example a switch of the "mercoid" type, the operating member of which is connected to a trip lever 232. This lever is arranged to extend along the bottom of the trough 182, so that it is normally held down by the weight of fruit passing over the same. In the event the supply of fruit is discontinued, trip 232 is permitted to move upwardly, to interrupt the contact of switch 231. This switch is electrically connected to the electrical hookup of the machine, which includes contactor 233, starting switch 234, and solenoids 222d and 228f. When the contacts of the controlling switch 231 are opened, contactor or switch 233 is operated, to close the solenoid valves 222d and 228f, and to interrupt further supply of current to the motor 191. Switch 234 is shown provided with a starting lever 235.

Reference has previously been made to the withdrawal of the majority of the juice from the receiver 206. A fair amount of juice drips from the fruit while it is being impaled and severed by the knife 116, but this juice contains a certain amount of peel oil, and is therefore not of as high a quality, as the juice collected in receiver 206. As a convenient means for collecting the former juice, the bottom inclined wall 16 of the casing is interrupted by a lateral trough 236, which serves to catch juice and drain it away to the exterior of the machine through pipe 237. The expelled peels, which drop down into the passage 17, can be removed through a spring-held door 238, or some other mechanism can be provided to exclude air from the atmosphere.

It is evident that conventional types of burrs 26 can be employed. However conventional burrs tend to cut and tear away the pithy material and whitish cellular membranes found in citrous fruit. I prefer to use burrs as shown in Figs. 18 and 19, which consist of a generally conical shaped body 241, having a rounded forward end 242. Spirally disposed ribs 243 are formed on this body, the spiral being clockwise for counterclockwise rotation, as viewed in Fig. 18. The trailing faces 244 of the ribs are at a relatively abrupt angle, while the advancing faces 246 present a relatively gradual slope against the fruit. The height of each rib also tapers to a minimum toward the forward end 242. When citrous fruit is applied to such a burr, the burr does not tend to advance itself into the fruit, and does not tend to cut or tear out fragments of the cellular membrane. What happens is that pressure exerted between the outer edges 247 of the ribs, and the fruit, serves to disrupt juice sacs or cells, without cutting away or causing detachment of any material part of the tough cellular membrane, from the peel.

Reference has been made to the discharge of peel through door 238. To afford a more effective seal against escape of carbon dioxide, an arrangement as shown in Fig. 17 can be used. In this instance door 238 is removed, and a vertical endless conveyor 251 provided. The lower part of the conveyor housing 252 communicates with the chute 17, while the upper part of the housing has a discharge opening 253, at an elevation above the working chamber of the machine. The carbon dioxide, being heavier than air, will seek a level in housing 252, but will not escape to any serious extent. Instead of sealing in this manner, water can be placed in the lower part of housing 252, to afford a water seal for chute 17.

The complete operation of my machine can now be reviewed as follows: The articles of fruit to be juiced, such as oranges, are fed down through the trough 182, in a position to be admitted one by one, to the machine. When the electric motor is started in operation, doors 163 and 164 operate cyclically, to admit articles of fruit, one by one. As each article of fruit enters the machine, it drops into the centering cup 136, and then because of the cyclic operation of this cup, it is raised and impaled upon the blade 116. Immediately after the article of fruit is thus impaled, the centering cup 136 drops back to its initial position as shown in Fig. 2, to receive a succeeding article of fruit.

The article of fruit impaled upon the blade 116, now has its opposite sides engaged by the two cups 36, and then the blade swings forward a limited amount, to pass completely through the fruit, and thus complete severing into two halves. At the completion of this operation, the two cups 36 retract and swing 90 degrees in opposite directions, to face the rotating burrs 26. The cups then move forward under the urge of pneumatic pressure applied behind pistons 33, to press the two halves of the fruit upon the burrs, and thus carry out a juicing operation. Upon completing the juicing operation the cups 36 start to retract, and after the initial part of this retracting movement carbon dioxide under pressure is applied to the interior of the cups, to blow away the peel. When the cups have been retracted they are swung through 90 degrees, to their initial positions illustrated in Fig. 1. In the meantime a new article of fruit has been impaled upon knife 116, by the centering cup 136, and therefore the cups 36 may immediately move forward to grip the two halves of the same.

Without any adjustment whatsoever the machine will operate over a comparatively wide range of diameters. In other words the diameter of the fruit may vary within a substantial latitude, without interfering with proper operation. However, for wide variations in the size of the fruit to be handled, as for example a change to lemons, or from oranges to grapefruit, some adjustment of the machine is required. This adjustment involves a substitution of cups 36, of proper size, and also an adjustment of the stroke of the centering cup 136, by varying the setting of the threaded rod 158. With the type of adjustment described it is a simple matter to properly adjust the stroke of the centering cup, to bring fruit of any given size into proper centralized position for engagement by the cups 36.

I claim:

1. In a fruit handling machine, a pair of fruit handling devices adapted to grip the two halves of an article of fruit, and means for presenting articles of fruit to said devices and for handling the same, said last means including a cup movable from a position in which it receives articles of fruit to a position in which it presents the fruit to said devices, a blade disposed in the path of movement of the fruit whereby when the cup moves an article of fruit to said position of presentation the fruit is impaled upon the blade, said blade being also movable in a direction towards the cup, and means for actuating the cup, the knife, and said fruit handling devices, to afford an automatic cycle of operation in which the cup, after receiving an article of fruit, moves to transpose the article of fruit to said position of presentation and to impale the same upon said knife, following which the cup moves back towards its initial position, the two fruit handling devices are caused to grip the two sides of the article of fruit on opposite sides of the knife, and while the two halves of the fruit are so gripped, the blade is moved through the fruit to completely sever the two halves.

2. In a fruit juicing machine, a pair of fruit handling devices adapted to grip the two halves of an article of fruit, and means for presenting articles of fruit to said devices and for handling the same, said last means including a centering cup movable from an upright position in which it receives articles of fruit to a position in which it presents the fruit to said devices, a blade disposed in the path of movement of the fruit, whereby when the cup moves an article of fruit to said position of presentation the fruit is impaled upon the blade, said blade being movable in a direction towards the initial position of said cup, but for only a fraction of the travel of the cup, and means serving to actuate the centering cup, said fruit handling devices, and said blade, whereby a cycle of operation is afforded in which an article of fruit placed upon the centering cup is translated by movement of the cup to said position of presentation, following which the centering cup is moved back to its initial position, the two halves of the fruit on opposite sides of the knife are engaged by said fruit handling devices, and while the two halves are so gripped said blade is moved toward the centering cup to completely sever the two halves.

3. In a machine of the character described, a blade, means for effecting impalement of an article of fruit on the knife, a pair of spaced rotatable burrs positioned on opposite sides of the plane of the blade, both said burrs having their axis of rotation in the same plane, a pair of fruit handling devices supported for pivotal movement in opposite directions upon axis parallel to and on opposite sides of the plane of the knife, means for effecting cyclic actuation of said devices, the cyclic actuation including gripping of the two halves of an article of fruit while the article of fruit is impaled on the knife, followed by swinging movement in opposite directions to bring both halves of said fruit into alignment with the axis of said burrs, means for actuating said knife, to completely sever the two halves of the fruit from each other, while the two halves are gripped by said fruit handling devices, and means for effecting relative reciprocating movement between the burrs and the gripped halves of the fruit while said halves are in such aligned position.

4. In a fruit handling machine of the character described, an arm mounted for swinging movement in a vertical plane, a fruit receiving and centering cup carried by the free end of the arm, the cup in one limiting position of the arm being faced upwardly to receive an article of fruit, and in the other position of the arm being elevated to present the article of fruit for a subsequent operation, a blade likewise mounted for swinging movement in said plane, and means for cyclically actuating said arm and said blade, whereby said centering cup is first swung upwardly to impale an article of fruit upon said blade, after which the centering cup moves back to its initial position and the blade is moved for a fraction of the distance towards said centering cup, to completely sever the two halves of the fruit.

5. In a fruit handling machine of the character described, a fruit handling device comprising a cup adapted to engage one side of an article of fruit, a rotatable burr, and means for projecting and retracting the cup with respect to the burr, said last means including two parts retained together for sliding movement along a common linear axis, the cup being mounted on one of said parts, means for securing the other one of said parts to a fixed support for swinging movement about an axis substantially at right angles to said first mentioned axis, pneumatic pressure means for causing relative sliding movement between said parts to project said cup with respect to said support, and spring means serving to automatically retract said cup.

6. In a fruit handling machine of the character described, a member forming a cylinder, a piston slidably fitted within said cylinder, a cup secured to said piston and adapted to engage one side of an article of fruit, means serving to pivotally support said cylinder with swinging movement about an axis substantially at right angles to the axis of the cylinder, means for supplying pneumatic pressure to said cylinder to effect projection of said cup with respect to the cylinder, and spring means normally serving to urge said cup and said piston towards retracted position.

7. In a machine of the character described, an arm mounted for swinging movement in a vertical plane, a fruit receiving and centering cup carried by the free end of said arm, the cup in one limiting position of the arm being faced upwardly to receive an article of fruit, and in the other position of the arm being elevated to present the article of fruit for subsequent operation, a blade mounted in said plane and adapted to pierce an article of fruit moved by the cup to said elevated position of the same, a pair of fruit gripping cups adapted to engage opposite sides of an article of fruit, means serving to mount said cups for pivotal movement about vertical axes spaced equal distances on opposite sides of said plane, actuating means for cyclically swinging said arm, and means for adjusting the amplitude of said swinging movement, thereby enabling adjustment of the machine for different sized fruit.

8. In a fruit juicing machine, a rotating burr, a cup adapted to engage a halved article of fruit and to present the same upon the burr, means for evacuating the cup to enable it to grip the fruit, means forming a closed chamber within which the burr and the cup are disposed, and means for applying an inert gas under pressure to said cup to expel peel from the same and to maintain an inert atmosphere in said chamber.

9. In a machine of the character described, a juicing burr comprising a generally conical shaped body having a rounded forward end, and ribs spirally disposed on the periphery of the body, said ribs, as viewed from the forward end of the burr, receding to the base of the body in a direction opposite to the direction of rotation, said ribs also having advancing faces which are sloped gradually and trailing faces which are sloped steeply.

HAROLD F. WATKINS.